United States Patent [19]

Kato

[11] Patent Number: 5,322,901
[45] Date of Patent: Jun. 21, 1994

[54] RESIN OR RUBBER COMPOSITION HAVING GOOD HEAT SHRINKABILITY

[75] Inventor: Mitsuru Kato, Aichi, Japan

[73] Assignee: Toyoda Gosei Co., Ltd., Nishikasugai, Japan

[21] Appl. No.: 782,548

[22] Filed: Oct. 25, 1991

[30] Foreign Application Priority Data

Oct. 29, 1990 [JP] Japan .................................. 2-292615
Oct. 29, 1990 [JP] Japan .................................. 2-292616

[51] Int. Cl.$^5$ .............................................. C08L 9/00
[52] U.S. Cl. ................................. 525/232; 525/191; 525/193; 525/227; 525/231; 525/238; 525/239; 525/240; 428/34.9; 524/439; 524/440; 524/441; 524/519

[58] Field of Search ............... 525/232, 227, 191, 193, 525/231, 238, 239, 240; 428/34.9; 524/439, 440, 441, 519

[56] References Cited

U.S. PATENT DOCUMENTS

| | | | |
|---|---|---|---|
| 4,431,861 | 2/1984 | Clabburn et al. | 428/34.9 |
| 4,593,062 | 6/1986 | Puydak et al. | 525/232 |
| 5,057,345 | 10/1991 | Barrett | 525/199 |
| 5,086,121 | 2/1992 | Hazelton et al. | 525/227 |

Primary Examiner—John Kight, III
Assistant Examiner—John M. Cooney, Jr.
Attorney, Agent, or Firm—Cushman, Darby & Cushman

[57] ABSTRACT

The disclosure describes a resin and rubber composition with good heat-shrinkability characteristics. Also described is a resin and/or rubber composition having dispersed therein a metal compound used for heating the composition.

12 Claims, 1 Drawing Sheet

RESIN OR RUBBER COMPOSITION HAVING GOOD HEAT SHRINKABILITY

FIELD OF THE INVENTION

The present invention relates to a heat-shrinkable material which can be utilized as a hose protector, a shape-memory material, and other applications.

BACKGROUND OF THE INVENTION

Conventionally known cylindrical protectors to be fitted to the outer circumferential walls of hoses including those used with vehicle engines are made of thermoplastic resins such as vinyl chloride resins.

This kind of protector has the following problem. If a protector having a larger inner diameter is used, so as to make the insertion of a hose thereinto easy, the space between the hose and protector makes it difficult to unite the hose and protector together. On the other hand, if a protector having a small inner diameter is used, to reduce the space between the hose and protector, the insertion of the hose into the protector is difficult.

To eliminate the above problem, a heat-shrinkable tube is used which is larger in diameter than a hose inserted thereinto, and upon heating, the tube shrinks to form a tight seal on the hose.

Heat-shrinkable materials used for producing such heat-shrinkable tubes and other heat-shrinkable products include resins such as vinyl chloride resins, polypropylene resins, polyamide resins, fluoroplastics, and the like and rubbers such as ethylene-propylene-diene copolymer rubbers (EPDM), chloroprene rubbers (CR), acrylonitrile-butadiene copolymer rubbers (NBR), and the like.

Known heat-shrinkable tubes have the following problems. Heat-shrinkable tubes made of a resin are too hard when in the enlarged-diameter state and after heat shrinkage. Conversely, heat-shrinkable tubes made of rubber cannot retain their expanded shape, and are too soft when in the enlarged-diameter state and after heat shrinkage.

Heat-shrinkable tubes made of a resin or rubber generally have low thermal conductivities and thus cannot be heated at a high rate. Low thermal conductivity makes temperature control difficult and the article to be covered with the heat-shrinkable material is heated to an undesirably high temperature.

SUMMARY OF THE INVENTION

An object of the present invention is to provide a heat-shrinkable material which has a high thermal conductivity, thereby eliminating the foregoing problems associated with low thermal conductivity.

To obtain this objective, according to the first embodiment, a metal powder capable of being heated by means of induction heating is dispersed within a rubber, resin or mixture thereof.

Another object of the present invention is to provide a heat-shrinkable composition which can be easily shaped, retain an enlarged state, have good heat shrinkability, and show good rubbery properties before and after heat shrinkage, thereby eliminating the foregoing problems associated with resins or rubbers.

To obtain this objective, according to the second embodiment, a resin and a rubber are kneaded together, a tube shape is formed, the tube is heated, forced to an expanded state and then cooled in this expanded state. When cooled, the resin becomes rigid forcing the tube to stay in an expanded shape. Upon heating the resin becomes flexible thereby allowing the rubber to exhibit its elastic properties and return the tube to its starting diameter.

BRIEF DESCRIPTION OF THE DRAWINGS

FIG. 1 is a perspective view illustrating an expanded heat-shrinkable tube, as an example of the present invention, and a rubber hose to which the heat-shrinkable tube is to be fitted.

FIG. 2 is a perspective view illustrating the heat-shrinkable tube before expansion.

FIG. 3 is a perspective view illustrating the heat-shrinkable tube fitted to the rubber hose.

DETAILED DESCRIPTION OF THE INVENTION

Figure 2:
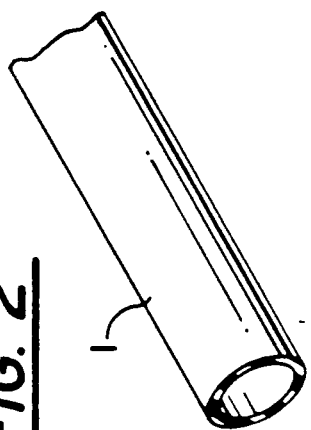
FIGS. 1 to 3 show an example of the present invention and an application example thereof.

The above and other objects of the invention are accomplished with a resin and/or rubber composition having heat shrinkability which comprises (1) a resin and/or a rubber and dispersed therein a metal powder capable of being heated by means of induction heating, or comprises (2) a resin and rubber composition obtained by blending a rubber with a resin compatible with the rubber, heating the resulting composition to a temperature not lower than the softening temperature of the resin, expanding the heated composition, and cooling the expanded composition while maintaining the expanded state thereof.

The matrix of the heat-shrinkable material according to the present invention is a resin and/or a rubber. Examples of the resin include vinyl chloride resins, polyethylene (PE), polypropylene (PP), and the like. Examples of the rubber include NBR, CR, silicone rubbers, EPDM, and the like.

These resins and rubbers are normally used singly, but they can be used in combination, as disclosed in embodiment (2).

In embodiment (1), the metal powder incorporated in the above-described resin and/or rubber composition and capable of being heated by means of induction heating, is a powder of a metal which generates eddy current and gives out heat upon irradiation with electromagnetic waves such as, for example, light or electric waves. Examples of such a metal powder include powders of iron, stainless-steel, iron-based alloys, aluminum, aluminum alloys, and the like.

The amount of metal powder incorporated is preferably 15% or less and more preferably from 1% to 15%, of the weight of the composition. Greater amounts can impair the elasticity and other properties of the composition, and at lesser amounts the powder may not exhibit its effects.

The metal powder, for example, can have particle sizes of 0.05 to 0.5 mm in diameter and a spherical shape or a fiber shape (preferably a pherical shape).

The metal powder must be kneaded until uniformly dispersed within the resin and/or rubber composition. If dispersion of the metal powder is not uniform, the composition can be heated unevenly resulting in impaired heat shrinkability.

A method of use for embodiment (1) is as follows. A predetermined amount of a metal powder capable of being heated by induction heating is uniformly mixed with a resin and/or a rubber. The thus-obtained heat-shrinkable composition is formed into a predetermined shape, for example, a cylinder having a wall thickness of several hundreds of micrometers. In the case where a rubber is employed in the composition, the shaped composition is subjected to a vulcanization treatment. Subsequently, the shaped composition is heated at a temperature not lower than the softening temperature of the resin, or the rubber if no resin is used in the composition, and not higher than the decomposition temperature thereof, and expanded to a predetermined degree. While in the expanded state, the composition is cooled. The expanded composition is fitted to an article to be covered. Upon irradiation with electromagnetic waves the powdery metal contained in the composition immediately generates heat due to eddy current which heats the whole composition, whereby the composition contracts to its original size.

Additives such as a foaming agent and a weatherability improver can be incorporated into the resin and/or rubber composition of embodiment (1), according to the use or application. For example, in the case where a foaming agent is incorporated, a material having foamability and the above-described heat shrinkability can be obtained.

In embodiment (2) the rubber and resin mixed with each other should be compatible. If the resin and rubber combined are not compatible with each other the resulting matrix undergoes phase separation. Then the properties of each of the resin and rubber cannot be fully exhibited and the final heat-shrinkable composition can not fully perform the function of, for example, a heat-shrinkable tube. By contrast, use of a rubber and resin compatible with each other enables the resin to be uniformly dispersed into the rubber, so that the properties of each component are fully exhibited.

Solubility parameters (SP values) for rubbers and resins are useful to find compatible rubbers and resins. SP values are calculated from the cohesive energies of rubbers and resins, and known SP values for several rubbers and resins are listed in Table 1.

TABLE 1

| Rubber or Resin | SP Value (cal/ml) |
|---|---|
| Nitrile rubber (butadiene/acrylonitrile = 80/20 by weight) | 9.3–9.5 |
| Nitrile rubber (butadiene/acrylonitrile = 60/40 by weight) | 10.3–10.5 |
| CR | 8.1–9.4 |
| Isoprene rubber | 8.0 |
| EPDM | 7.9–8.0 |
| Vinyl chloride resin | 9.5–9.7 |
| Polyethylene | 7.9 |
| Polypropylene | 7.8–8.0 |

The nearer the SP values of a rubber and resin, the better the compatibility between the two. It is preferred to select a combination of a rubber and a resin so that the difference between the SP value of the rubber and that of the resin is within 2.5 cal/ml, with the more preferred SP value differences being within 1.5 cal/ml. If the Sp value difference is more than 2.5 cal/ml, the rubber and resin are less likely to be uniformly mixed with each other resulting in a final composition that is less apt to exhibit good heat shrinkability and desired properties after heat shrinkage.

Examples of the rubber employed in this invention include nitrile rubbers (NBR), chloroprene rubbers (CR), isoprene rubbers (IR), EPDM, and the like. Examples of the resin incorporated in such a rubber include vinyl chloride resins, acrylic resins, polyethylene (PE), polypropylene (PP), and the like. Preferred rubber-resin combinations include combinations of NBR and a vinyl chloride resin, CR and a vinyl chloride resin, IR and either PE or PP, EPDM and PE, EPDM and PP, and the like.

The ability of the composition to retain its expanded state (enlarged-diameter state in the case of a cylindrical form), the hardness of the composition in the expanded state, the degree of shrinkage of the composition during shrinkage, the shrinkage stress resulting from shrinkage, and the properties of the composition after shrinkage are greatly affected by the properties originally possessed by the resin incorporated, such as the viscoelastic behavior and stress-strain (S-S) curve in tension of the resin, and the proportion of the resin mixed with the rubber. Therefore, these factors should be regulated according to desired various properties.

The amount of the resin mixed with the rubber is preferably 5 parts by weight to 50 parts by weight, and more preferably 15 parts by weight to 45 parts by weight, per 100 parts by weight of the rubber. Resin amounts below 5 parts by weight are not preferred because the expanded state of the composition may not be kept unchanged. On the other hand, resin amounts exceeding 50 parts by weight are not preferred because the shrink properties and the rubbery elasticity after shrinkage which are originally possessed by the rubber may not be exhibited. The smaller the proportion of the resin, the more the rubbery elasticity of the composition is enhanced. The more the resin proportion, the weaker the rubbery elasticity of the composition.

The expanded state is maintained as it is in the expanded state because the resin inhibits the rubber in the composition from recovering its original state. Upon heating, the resin loses the ability to maintain the expanded state and, as a result, the composition returns to its original size to exhibit moderate rubbery properties.

It is preferable that the resin have a low melting point to facilitate the mixing thereof by means of a kneading machine or other mixing device.

A method of use for embodiment (2) is as follows. A compatible rubber and resin is uniformly mixed. The rubber and resin composition is formed into a predetermined shape, for example, a cylinder having a wall thickness of several hundreds of micrometers, and then subjected to vulcanization treatment. Subsequently, the shaped composition is heated at a temperature not lower than the softening temperature of the resin and not higher than the decomposition temperature thereof, expanded to a predetermined degree and cooled while in the expanded state. Thereafter, the expanded composition is fitted, for example, to an article to be covered, and then heated at the softening temperature of the resin for several tens of seconds, whereby the composition fitted to the article to be covered is brought into tight contact with the article.

Additives such as a foaming agent and a weatherability improver can be incorporated into the composition of embodiment (2), according to the use or application. For example, in the case where a foaming agent is incorporated, a material having foamability and the above-described heat shrinkability can be obtained.

The present invention is explained below in more detail with reference to the following examples, which should not be construed to be limiting the scope of the invention.

EXAMPLE 1

Figure 3:
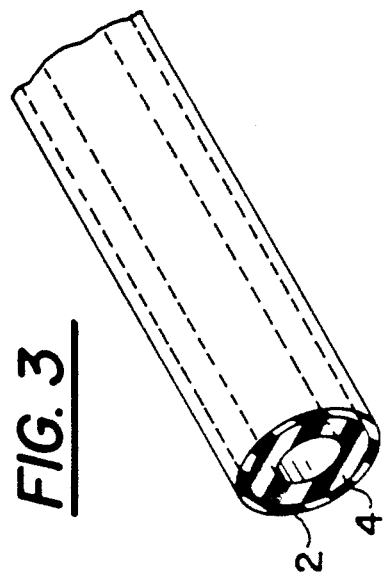
Figure 1:
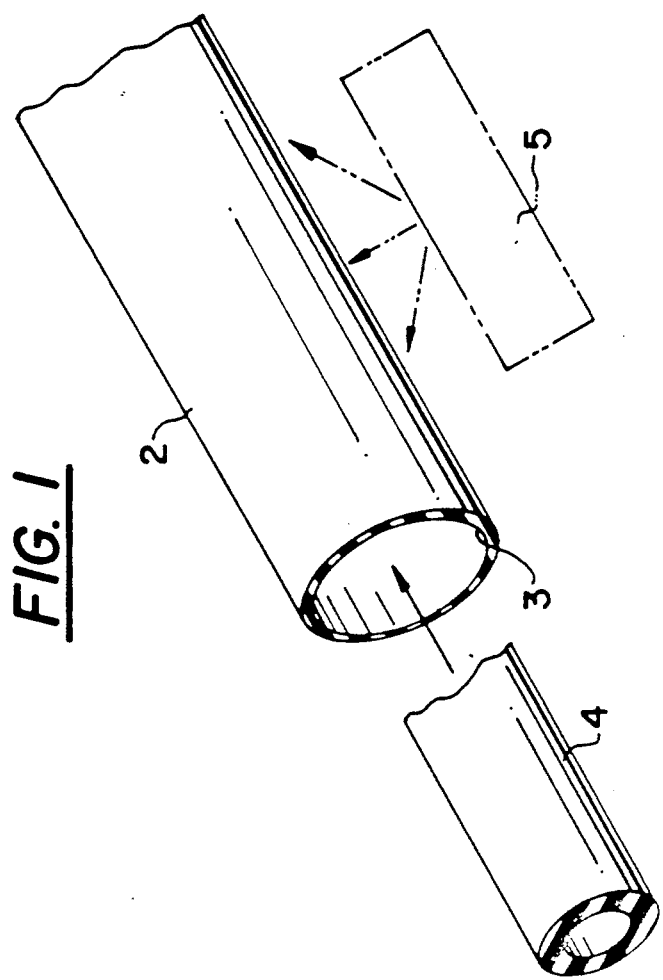

This example illustrates, with reference to FIGS. 1 to 3, a rubber hose protector as one embodiment of the heat-shrinkable material of the present invention.

First, 5 parts by weight of an iron powder was added to 100 parts by weight of EPDM (i.e., ethylene-propylene-diene copolymer rubbers) together with additives including a vulcanizing agent, and the resulting composition was kneaded until it became uniform. If dispersion of the iron powder into the EPDM is not uniform, the composition is heated unevenly resulting in impaired heat shrinkability. Iron powder having relatively large particle diameters of 0.05 to 0.1 mm was employed for the purpose of lessening the influence on the vulcanization reaction of the EPDM. From the standpoint of dispersibility during mixing, the preferred shape of the iron powder particles is spherical. The composition was then shaped into a thin-wall cylindrical form as shown in FIG. 2 to obtain an unexpanded shape 1. This unexpanded shape 1 was vulcanized by heating.

The unexpanded shape 1 was then heated to a temperature of 150° C. and the diameter of the shape was enlarged, as shown in FIG. 1, until the inner diameter of the shape became 1.75 times that of the unexpanded shape 1. The expanded shape was then cooled to 20° C. while being kept in the enlarged-diameter state, thereby completely solidifying the shape. Thus, a heat-shrinkable tube 2 was obtained.

Subsequently, a rubber hose 4 having an outer diameter slightly larger than the inner diameter of the above unexpanded shape 1 was inserted into the hollow 3 of the above-obtained heat-shrinkable tube 2. The heat-shrinkable tube 2 was then irradiated with electromagnetic waves having a frequency of 9 MHz and emitted from an electromagnetic wave irradiator 5 at an electric current of 7 A. Upon this electromagnetic wave irradiation, the heat-shrinkable tube 2 was heated to a temperature of 150° C. Thus, the heat-shrinkable tube 2 contracted to its original size, i.e., the size of the unexpanded shape 1 and, as a result, the tube 2 was tightly fitted to the outer circumference wall of the rubber hose 4, as shown in FIG. 3.

Powdery iron having a high thermal conductivity had been uniformly incorporated in the heat-shrinkable tube 2, allowing the temperature of the heat-shrinkable tube 2 to rise at a rate so high that the shrinkage of tube 2 was completed in approximately 5 seconds.

The heat-shrunk tube 2 fitted to the outer circumference wall of the rubber hose 4 had rubbery elasticity and was able to fully exhibit the function of a protector.

When a foamable EPDM was employed as the matrix of the heat-shrinkable tube 2, the heat-shrinkable tube 2 was heated to a temperature of 150° C. and the heat shrinkage thereof was completed in approximately 10 seconds. This was satisfactorily short although longer than that for the above-described non-foamable one.

Due to the metal powder, heatable by induction heating and almost uniformly incorporated into the heat-shrinkable tube 2, and due to the electromagnetic wave heating employed as a means for contracting the heat-shrinkable tube 2, the metal powder in the heat-shrinkable tube 2 rapidly gave out heat upon irradiation with electromagnetic waves causing the heat-shrinkable tube 2 to shrink completely within a reduced time period. The electromagnetic wave irradiation employed as a heating means has not only attained a high heating rate as described above but also made it possible to control the heating rate by changing the intensity of the electromagnetic waves, thus attaining easier temperature control than conventional heating methods. Furthermore, only the metal powder in the heat-shrinkable tube 2 generates heat upon irradiation with electromagnetic waves, not the resin and/or rubber, so that the rubber hose 4 itself, as the article to be covered, is never heated directly. According, the rubber hose 4 is heated only by the heat transfer from metal powder in the heat-shrinkable tube 2 through the resin and/or rubber in tube 2. Therefore, there is no deterioration of the performance of the rubber hose 4.

As described above, the rubber and/or resin composition of the present invention can be heated at a heightened rate due to the high thermal conductivity thereof. Therefore, it brings about the effects that the heat shrinkage thereof can be completed within a shortened time period and that the article to be covered with the heat-shrinkable material won't be heated to an undesirably high temperature.

EXAMPLE 2

This example illustrates, with reference to FIGS. 1 to 3, a rubber hose protector as one embodiment of the rubber and resin composition of the present invention.

First, 20 parts by weight of PE (what specific compound) was added to 100 parts by weight of an EPDM (i.e., ethylene-propylene-diene copolymer rubbers) together with additives including a vulcanizing agent. The composition was kneaded with heating. During this kneading, the EPDM and PE (i.e., polyethylene) showed extremely good compatibility with each other. The resulting composition was then shaped into a thin-wall cylindrical form as shown in FIG. 2 to obtain unexpanded shape 1. This unexpanded shape 1 was vulcanized by heating.

The resulting unexpanded shape 1 was then heated at temperatures of 120° C. and 150° C. and the diameter of each heated shape was enlarged, as shown in FIG. 1, until the inner diameter of each shape became 1.75 times that of the unexpanded shape 1. Each of the unexpanded shapes was then cooled to 20° C. while being kept in the enlarged-diameter state, thereby completely solidifying the shape. Thus, heat-shrinkable tubes 2 were obtained.

Subsequently, a rubber hose 4 having an outer diameter almost equal to the inner diameter of the above unexpanded shape 1 was inserted into the hollow 3 of each of the above-obtained heat-shrinkable tubes 2. Heat shrinkage treatment of one of the tubes 2 was conducted at 120° C., while that of the other was conducted at 150° C. Upon this heating, each heat-shrinkable tube 2 contracted to the size of the unexpanded shape 1, with the error being within ±2%, and as a result, each tube 2 was tightly fitted to the outer circumferential wall of the rubber hose 4, as shown in FIG. 3.

The heat-shrunk tube 2 thus fitted to the outer circumferential wall of the rubber hose 4 was able to fully exhibit the function of a protector.

As described above, the rubber and resin composition of the present invention can retain its expanded state, has excellent heat shrinkability, and possesses proper rubbery properties before and after heat shrinkage.

While the invention has been described in detail and with reference to specific embodiments thereof, it is apparent to one skilled in the art that various changes and modifications can be made therein without departing from the spirit and scope thereof.

What is claimed is:

1. A composition comprising a rubber blended with a resin which is compatible with said rubber, an amount of said resin being between 5 and 50 parts by weight per 100 parts by weight of said rubber, a solubility parameter value difference between said rubber and said resin is less than or equal to 2.5 cal/ml, a spherical shaped metal powder dispersed throughout said composition capable of being heated by means of induction heating and having a particle diameter of 0.05 to 0.5 mm, said spherical shaped metal being present in an amount from 1% to 15% by weight of said composition, said composition being obtained by:
 vulcanizing said rubber;
 heating a mixture of said rubber and said resin to a temperature not lower than the softening temperature of said resin;
 expanding said heated composition;
 cooling said expanded composition while maintaining the expanded state thereof; and,
 heating by induction heating to heat shrink said composition.

2. The composition as in claim 1, wherein said solubility parameter value is less than or equal to 1.5 cal/ml.

3. The composition as in claim 1, wherein said rubber includes at least one rubber selected from the group consisting of acrylonitrile-butadiene copolymer rubbers, chloroprene rubbers, ethylene-propylene-diene copolymer rubbers, isoprene rubbers, and mixtures thereof, and said resin includes at least one resin selected from the group consisting of vinyl chloride resins, acryl resins, polypropylene and polyethylene, and mixtures thereof.

4. The composition as in claim 1, wherein said rubber comprises EPDM and said resin comprises at least one of polyethylene and polypropylene.

5. The composition as in claim 1, wherein the induction heating utilizes electromagnetic waves comprising light and electric waves.

6. The composition as in claim 1, wherein said metal powder includes at least one powder selected from the group consisting of iron, stainless-steel, iron alloys, aluminum and aluminum alloys.

7. A method of heat shrinking a heat-shrinkable composition comprising the steps of:
 induction heating a heat-shrinkable composition comprising a rubber blended with a resin which is compatible with said rubber, an amount of said resin being between 5 and 50 parts by weight per 100 parts by weight of said rubber, a solubility parameter value difference between said rubber and said resin is less than or equal to 2.5 cal/ml, a metal powder dispersed throughout said composition capable of being heated by means of induction heating, said composition being obtained by:
 vulcanizing said rubber;
 heating a mixture of said rubber and said resin to a temperature not lower than the softening temperature of said resin;
 expanding said heated composition; and,
 cooling said expanded composition while maintaining the expanded state thereof.

8. The method according to claim 9, wherein said solubility parameter value is less than or equal to 1.5 cal/ml.

9. The method according to claim 7, wherein said rubber includes at least one rubber selected from the group consisting of acrylonitrile-butadiene copolymer rubbers, chloroprene rubbers, ethylene-propylene-diene copolymer rubbers, isoprene rubbers, and mixtures thereof, and said resin includes at least one resin selected from the group consisting of vinyl chloride resins, acryl resins, polypropylene and polyethylene, and mixtures thereof.

10. The method according to claim 7, wherein said rubber comprises ethylene-propylene-diene copolymer rubbers and said resin comprises at least one of polyethylene and polypropylene.

11. The method according to claim 7, wherein the step of induction heating utilizes electromagnetic waves comprising light and electric waves.

12. The method according to claim 7, wherein said metal powder includes at least one powder selected from the group consisting of iron, stainless-steel, iron alloys, aluminum and aluminum alloys.

* * * * *